United States Patent [19]

Ollivier et al.

[11] Patent Number: 4,854,793

[45] Date of Patent: Aug. 8, 1989

[54] CONE EXPANSION WALL PLUG

[75] Inventors: Jean Ollivier, Valence; Roland Almeras, Tournon, both of France

[73] Assignee: Societe de Prospection et d'Inventions Techniques, Valence, France

[21] Appl. No.: 863,066

[22] Filed: May 14, 1986

[51] Int. Cl.⁴ .............................................. F16B 13/06
[52] U.S. Cl. ...................................... 411/49; 411/39; 411/35; 411/60; 411/74
[58] Field of Search ................ 411/57, 44, 55, 60, 411/14, 34, 35, 36, 37, 38, 39, 40, 42, 71, 74, 49, 50, 51, 53

[56] References Cited

U.S. PATENT DOCUMENTS

| | | | |
|---|---|---|---|
| 942,693 | 12/1909 | Wintermute | 411/74 X |
| 4,015,505 | 4/1977 | Murray | 411/57 |
| 4,516,885 | 5/1985 | Calandra | 411/57 X |

FOREIGN PATENT DOCUMENTS

| | | | |
|---|---|---|---|
| 163152 | 12/1985 | European Pat. Off. | 411/57 |
| 2150572 | 4/1973 | Fed. Rep. of Germany | 411/55 |
| 2454022 | 5/1976 | Fed. Rep. of Germany | 411/71 |
| 2536136 | 3/1977 | Fed. Rep. of Germany | 411/55 |
| 3105038 | 9/1982 | Fed. Rep. of Germany | 411/57 |
| 680434 | 4/1929 | France | 411/71 |
| 859340 | 6/1940 | France | 411/55 |
| 1592228 | 5/1970 | France | 411/55 |
| 624738 | 8/1981 | Switzerland | 411/74 |
| 1364234 | 8/1974 | United Kingdom | 411/71 |
| 1442292 | 7/1976 | United Kingdom | 411/44 |
| 2109886 | 6/1983 | United Kingdom | 411/57 |

*Primary Examiner*—Neill Wilson
*Attorney, Agent, or Firm*—D. I. Roche; T. W. Buckman

[57] ABSTRACT

A cone expansion wall plug is provided comprising a threaded rod, an expansible socket, an expansion cone, an intermediate ring and a spacer between the head of the rod and said intermediate ring. During expansion and anchorage of the socket by the cone, the ring and the spacer prevent movement of the socket with respect to the rod. After anchorage, the rod may be screwed into the cone by shearing a collar of the spacer. During expansion, the socket only bears against the intermediate ring through a radial shoulder.

24 Claims, 3 Drawing Sheets

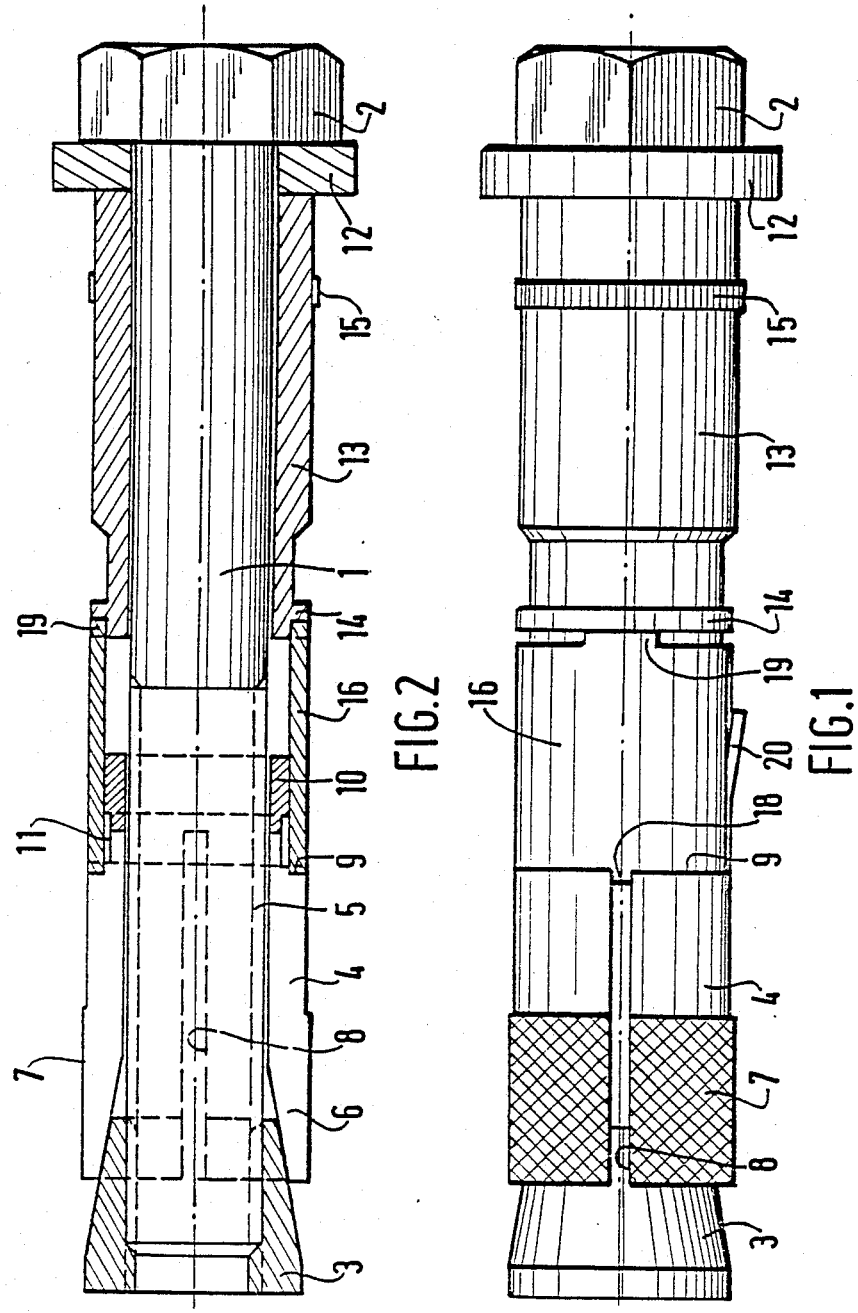

CONE EXPANSION WALL PLUG

BACKGROUND OF THE INVENTION

1. Field of the Invention

The present invention relates to a cone expansion wall plug, comprising a threaded rod or screw at one end, a tapped cone at the threaded end of the rod for expanding an expansible socket disposed about the rod and means adapted for immobilizing the socket, during expansion thereof against translation with respect to the rod and, after expansion of the socket, for allowing a translational movement of the rod with respect to the socket and so screwing of the rod into the cone.

Up to the moment when the expansion cone is immobilized, and with it the expansible socket, i.e. until the wall plug is anchored, the distance between the head of the screw and the expansible socket must remain practically constant otherwise the expansible socket may, during penetration of the cone, move towards the opening of the hole receiving the plug, which may affect the anchorage thereof. In other words, the expansible socket, during its expansion, must remain practically immobile in translation. Once the anchorage achieved, and the socket having in any case been moved slightly towards the opening of the hole receiving the plug during expansion thereof, that is to say that it has ridden up, it is necessary to firmly apply the part to be fixed by clamping it against the support material, in which the reception hole had been previously formed, by screwing the screw into the expansion cone which is then immobilized.

It will be noted that such a wall plug may serve for fixing any piece to a support material intended to receive it; it is a question preferably of heavy pieces to be fixed to hard materials, such as constructional materials for example.

2. Description of the Prior Art

The applicant has already proposed a wall plug of the above mentioned type, in which the immobilization means comprise a spacer disposed about the screw, between the head of the screw and the expansible socket, the socket being, at the outset, in abutment against a shearable collar of the spacer through an axial projecting portion.

But, for different reasons, among which lack of flexibility, during its expansion the expansible socket caused premature shearing of the collar of the spacer.

A wall plug of the above mentioned type is also known more particularly from French Pat. No. 1 592 228, in which the immobilization means comprise an intermediate ring between a spacer, in this case an enlarged diameter portion of the screw, and the expansible socket, and in abutment thereagainst, the intermediate ring being adapted so as to bend, after expansion of the socket, and so as to be deformed elastically, or swell, under the action of the screw screwed into the expansion cone.

But such a wall plug has the drawback that the intermediate ring, already during expansion of the socket and especially at the time of final locking, risks bending inwardly thus disturbing the screwing in and out of the screw.

The present invention brings then an improvement to this latter wall plug so as to overcome the disadvantage thereof.

SUMMARY OF THE INVENTION

For this, the present invention provides a cone expansion wall plug, comprising a rod threaded at one end, a cone tapped at the threaded end of the rod for expanding an expansible socket disposed about the rod and, disposed about the rod, a spacer and an intermediate ring bearing against the spacer and the expansible socket for immobilizing the socket, during expansion thereof, against a translational movement with respect to the rod and so as to allow, after expansion of the socket, a translational movement of the rod with respect to the socket and so screwing of the rod into the cone, wherein the intermediate ring is axially and radially rigid and the expansible socket comprises a portion of reduced outer diameter forming a radial bearing shoulder for the intermediate ring.

With the invention, on the one hand, the intermediate ring can no longer bend or buckle and, on the other hand, during expansion even if the expansible socket rides slightly up, its action on the intermediate ring, which could have repercussions on the spacer, is exerted through a reduced annular surface, which considerably limits the effect thereof.

In the preferred embodiment of the wall plug of the invention, the intermediate ring is in radial abutment against an angular shearable collar of the spacer, the ring being in axial abutment against the spacer and the narrowed portion of the expansible socket. Thus, assembly of the socket, of the intermediate ring and of the spacer is a telescopic assembly which has the advantage of maintaining the inner diameter of the bore receiving the threaded rod constant.

It is also advantageous to provide on the narrowed portion of the expansible socket an annular groove for increasing the resilience thereof and reducing the thrust of the socket on the intermediate ring.

When the expansible socket is provided with expansion slits, which is generally the case, because of its narrowed portion and because of the radial abutment shoulder thus formed, in which these slits also emerge, these slits may naturally receive anti-rotation indexing studs integral with the intermediate ring, without it being necessary to provide an additional special machining of the expansible socket.

Finally, and although the reaction of the intermediate ring on the spacer, and more particularly on the collar thereof during possible riding up of the socket during expansion, is as small as possible, it is preferable to provide axial crenellated portions extending the intermediate ring, in radial abutment against the shearable collar of this spacer.

Should the expansible socket ride up during expansion thereof, its action is limited to that of these crenellated portions. It is only during final locking that the spacer, then displaced in the other direction towards the bottom of the anchorage hole, itself causes shearing of its collar against the whole of the annular radial surface of the intermediate ring.

It will be noted here that the essential feature of the invention could just as well be applied to a wall plug comprising a theaded rod at both ends, with a nut mounted on the threaded portion opposite that of the tapped expansion cone. Rotation of the nut for anchoring the socket would cause riding up of the rod and with it that of the cone then interlocked in translation with the rod, so as to provide expansion, the other elements of the wall plug, with their functions, remaining unchanged. The final locking of the parts to be fixed would then be provided by means of a nut screwed onto the rod. A screwing slit formed at the end of the screw carrying the nut would further allow, before clamping of the part, the rod to be screwed into the immobilized cone and the projection of the rod from the anchorage hole to be adjusted.

The rod and the expansion cone could also form a monobloc assembly, the rod remaining threaded at its opposite end. In this end, the final clamping of the part could still be obtained by screwing on a nut, but the preceding adjustment could no longer be effected.

Therefore, the scope of the present application should then be extended to a cone expansion wall plug comprising a rod, at one end thereof a cone arranged so as to be driven in translation by the rod and so as to ensure expansion of an expansible socket disposed about the rod and, disposed about the rod, a spacer and an intermediate ring in abutment against the spacer and the expansible socket for immobilizing, during expansion thereof, the socket against translation with respect to the rod, wherein said intermediate ring is axially and radially rigid and said expansible socket comprises a portion of reduced external diameter forming a radial bearing shoulder for the intermediate ring.

BRIEF DESCRIPTION OF THE DRAWINGS

The invention will be better understood from the following description of several embodiments of the wall plug of the invention with reference to the accompanying drawings in which:

FIG. 1 shows a view of the wall plug of the invention, with a first embodiment of the intermediate ring;

FIG. 2 shows an axial sectional view of the wall plug of FIG. 1;

FIG. 7 shows an axial sectional view of a wall plug which includes a nut threaded to the upper end and which includes an integral expansion cone.

FIG. 8 shows an axial sectional view of a wall plug which has a nut threaded on to the upper end and which has a threaded expansion cone on its lower end.

DESCRIPTION OF THE PREFERRED EMBODIMENTS

Figure 5:
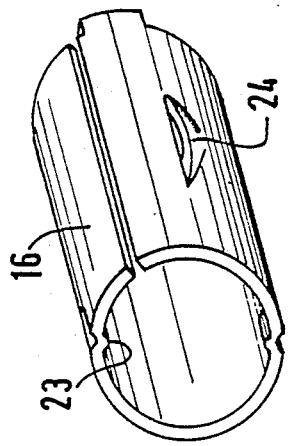
FIG. 5 shows a perspective view of a third embodiment of the intermediate ring of the wall plug of the invention.

The wall plug shown in the drawings comprises a rod or screw 1 having at one end a head 2 and a clamping washer 12, integral with the head, and at the other end a threaded portion 5 whose thread is intended to cooperate with the tapping of an expansion cone 3. An expansible socket 4 is disposed about the threaded portion 5 of screw 1 and its end 6, turned towards the end of the screw, comprises a conical inner surface complementary to the external surface of the expansion cone 3 for receiving this latter. This same end 6 of socket 4 comprises an external surface having anti-rotation roughened portions 7 forming, as in the example shown, a knurled surface. For its expansion, socket 4 comprises slits 8 formed from its free end turned towards the end of the screw to slightly beyond a shoulder 9 which will be discussed hereafter. The other end 10 of socket 4, which in the example shown extends over substantially a third of its length, has an outer diameter reduced with respect to the rest of the socket, so that the above mentioned radial shoulder 9 is thus formed. Between the shoulder 9 and the free end of the reduced portion 10 of socket 4 is formed an annular groove 11, called resilient groove.

A spacer 13 is disposed in abutment against washer 12 and about the non threaded part of rod 1. Slightly short of the end of the spacer opposite the head 2 of the screw, and integral with the spacer, is located a shearable collar 14 whose function will be described further on. In the central part of the spacer, its external surface has a setting indication 15, here in the form of an annular strip.

An intermediate ring 16 is fitted between socket 4 and the spacer 13. It is in radial abutment, on the one side, against shoulder 9 of socket 4 and, on the other side, against the external radial surface of collar 14 of the spacer through axial crenellated portions 19 extending it. These crenellated portions 19 are here diametrically opposite. The ring is in radial abutment, against the reduced external diameter portion 10 of socket 4 and, on the other side, through its crenellated portions 19, against the end portion of the spacer 13 extending beyond the collar 14.

The intermediate ring 16 is formed, in the example considered, from a strip of rigid metal sheet rolled into a cylinder closed on itself along the edges 17. This intermediate ring, which could just as well be made from molded steel or even from a tube, is therefore rigid axially and even radially.

Figure 3:
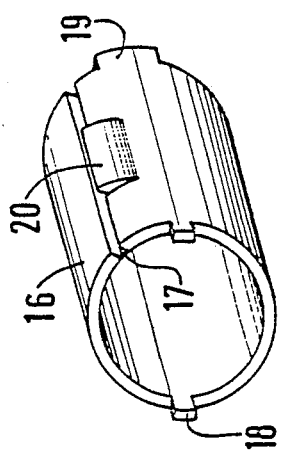
FIG. 3 shows a perspective view of the intermediate ring of the wall plug of FIGS. 1 and 2.
Figure 6:
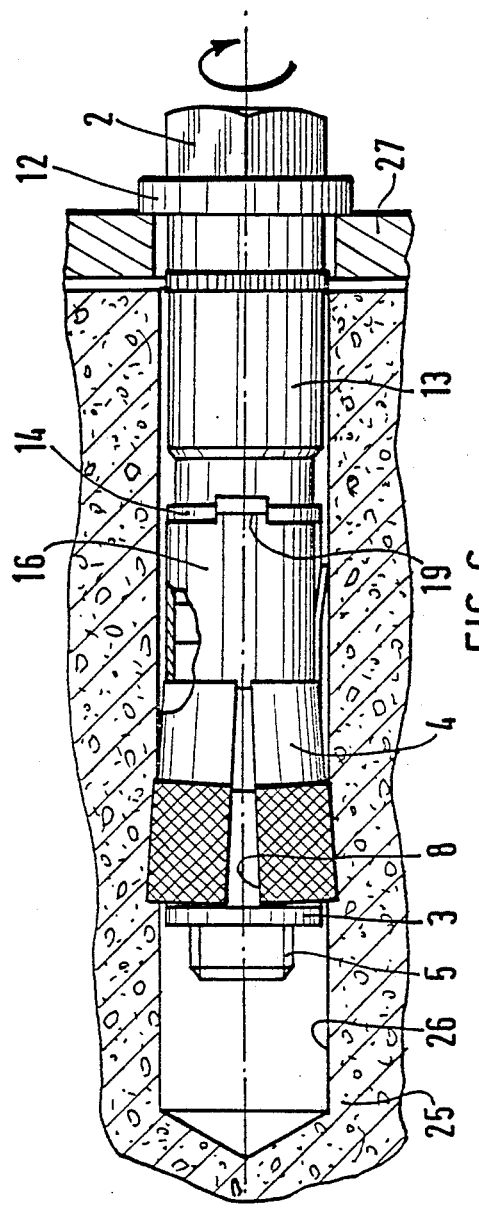
FIG. 6 shows an axial sectional view of the wall plug of FIGS. 1 to 3, after expansion, but before clamping of a part to be fixed.

In the embodiment shown in FIG. 3, on the other side from the crenellated portions 19, ring 16 has studs or projections 18, called anti-rotation indexing means, extending the ring axially and fitting into slit portions 8 of the socket 4 opening into the shoulder 9. To complete if need be the action of these projections, ring 16 has at its outer periphery one, as here, or several external deformations 20 or bosses adapted for creating an anti-rotation friction and thus facilitating the beginning of the expansion of socket 4. In the case of FIG. 3, the external deformation is a cylindrical pressing.

Figure 4:
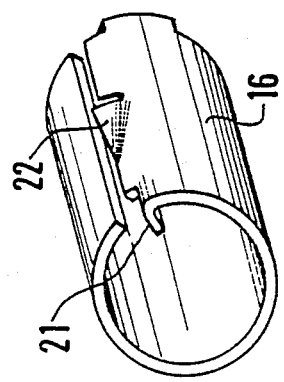
FIG. 4 shows a perspective view of a second embodiment of the intermediate ring of the wall plug of the invention.

In the embodiment shown in FIG. 4, the anti-rotation indexing means are formed by an axial tongue portion 21 bent back towards the axis of the ring and fitted into a slit portion 8 of socket 4, extending in its reduced outer diameter portion 10. The external deformation is a triangular pressing 22.

In the embodiment shown in FIG. 5, the indexing means are formed by axial indentations 23 formed by stamping from the outer surface of the ring. The axial deformation is a spherical pressing 24.

The structure of the wall plug having been described, its operation will now be discussed.

After boring in a support material 25 a hole 26 for receiving or anchoring the wall plug, this latter is fitted into this hole, through a piece 27 to be fixed to the material as far as the annular setting mark 15. The force required for introducing the wall plug, because of the pressing 20, 22, 24 of the intermediate ring 16, curbs rotation of this intermediate ring which, in its turn, indexes the expansible socket 4 against rotation. When screw 1 is screwed in, by means of its head 2, cone 3 is further introduced into socket 4 and causes expansion thereof, i.e. the widening of the portions of the socket extending between slits 8. During expansion, the knurled portion 7 contributes to preventing the wall plug from being driven in rotation and in translation. If the socket 4 rides up during expansion, which is often the case, it takes with it screw 1, because of the intermediate ring 16 and the spacer 13. If the force which the expansion cone 3 exerts on socket 4 reacts on ring 16, limited moreover because of shoulder 9 and groove 11, the ring 16, through its crenellated portions 19 exerts a force on the collar 14 of the spacer 13. During this expansion phase, at most the crenellated portion 19 of ring 16 locally penetrate into the collar but without shearing it if the bearing surface of the crenellated portions 19 is accordingly dimensioned.

With the socket riding up then slightly during the anchorage, the part 27 to be fixed may not be applied against the material 25, as it should be. In this case, with the wall plug correctly anchored, the screw 1 will be further screwed in. With cone 3 immobilized, screw 1 will be screwed into the cone while going further into the anchorage hole. At the beginning of this clamping phase, which may further offset defects of flatness or variations of thickness, head 2 of screw 1 causes spacer 13, and so its collar 14, to exert a force against the intermediate ring. At a given moment, this force will cause shearing of collar 14 and so allow screw 1 to penetrate further and clamp part 27, because of the telescopic assembly of ring 16 and the spacer 13 which is then slightly introduced further into this ring.

It will be noted that the function of the crenellated portions 19 of the intermediate ring 16 could be provided by other means, such for example as pressed tongues, or crimped portions of the ring first of all in abutment against the shearable collar or a shoulder of the spacer then, after clamping, passing beyond the collar or this shoulder.

In the embodiment of FIG. 7, the rod 1 has a threaded upper end 2a and a nut 2b instead of a head as described in the embodiment of FIGS. 1–3 and 6.

The lower end is monobloc construction in which the expansion cone 3a is integrally formed with rod 1. Other aspects of the wall plug are substantially similar to those of the embodiment of FIGS. 1–3 and 6.

In the embodiment of FIG. 8, like that of FIG. 7, the rod has an upper end 2a which is threaded to receive the nut 2b. As with the embodiment of FIG. 7, the nut is turned relative to the rod to cause axial movement of the rod and expansion of the socket 4. Like the embodiment of FIGS. 1–3 and 6, the expansion cone 3 is threadingly engaged by the lower end of the rod 1. Such arrangement allows for axial adjustment of the rod after the wall plug has been installed. Such adjustment might be necessary or desireable if the upper end of the rod protrudes excessively from the upper surface of the nut 2b.

What is claimed is:

1. A cone expansion wall plug comprising a rod, at on end thereof a cone adapted for being driven with a translational movement by the rod and causing expansion of an expansible socket disposed about the rod and, disposed about the rod, a spacer and an intermediate ring in abutment against the space and the expansible socket, for immobilizing the socket, during expansion thereof against translation with respect to the rod, wherein said intermediate ring is axially and radially rigid and said expansible socket having an annular resilience groove which provides a portion of reduced outer diameter and forms a radial bearing shoulder for said intermediate ring, said expansion socket having at least one longitudinal slit extending through an end of said socket opposite said intermediate ring, said intermediate ring having anti-rotation indexing means extending into said slit.

2. The expansion wall plug as claimed in claim 1, wherein said expansion cone and the corresponding end of said rod form a monobloc assembly, and the other end of said rod is threaded and carries a nut.

3. The expansion wall plug as claim in claim 1, wherein said expansion cone is tapped and mounted on a threaded end of the rod, said rod, after expansion of the socket, being able to be moved in translation with respect to the socket and screwed into the cone.

4. The expansion wall plug as claimed in claim 3, wherein the other end of the rod is also threaded and carries a nut.

5. The expansion wall plug as claimed in claim 4, wherein a screwing slit is formed in said other threaded end of the rod carrying the nut.

6. The expansion wall plug as claimed in claim 1, wherein said intermediate ring is in radial abutment against a shearable collar of the spacer, said ring being in axial abutment against the spacer and the reduced portion of the expansible socket.

7. The expansion wall plug as claimed in claim 5, wherein said intermediate ring is in radial abutment against a shearable collar of the spacer, said ring being in axial abutment against the spacer and the reduced portion of the expansible socket.

8. The expansion wall plug as claimed in claim 1, wherein said expansible socket comprises expansion slits and said intermediate ring comprises anti-rotation indexing means introduced into said slits.

9. The expansion wall plug as claimed in claim 1, wherein said indexing means comprise axially projecting studs, introduced into the slit protions of the socket opening into the radial bearing shoulder of the socket.

10. The expansion wall plug as claimed in claim 1, wherein said indexing means comprises an axial tongue portion bent back towards the axis of the intermediate ring and introduced into a slit portion of the narrowed portion of the socket.

11. The expansion wall plug as claimed in claim 1, wherein said indexing comprises an indentation introduced into slit portions of the narrowed portion of the socket.

12. The expansion wall plug as claimed in claim 6, wherein said intermediate ring comprises crenellated axially projection portions in radial abutment against the shearable collar of the spacer.

13. The expansion wall plug as claimed in claim 1, wherein said intermediate ring comprises an external anti-rotation deformation.

14. The expansion wall plug as claimed in claim 12, wherein said intermediate ring comprises an external anti-rotation deformation.

15. A cone expansion wall plug comprising a rod, at one end thereof a cone adapted for being driven with a translational movement by the rod and causing expansion of an expansible socket disposed about the rod and, disposed about the rod, a spacer and an intermediate ring in abutment against the spacer and the expansible socket, for immobilizing the socket, during expansion thereof against translation with respect to the rod, wherein said intermediate ring is axially and radially rigid and said expansible socket comprises a portion of reduced outer diameter forming a radial bearing shoulder for said intermediate ring, said spacer having an integral shearable collar disposed in abutment with crenellated axially projecting portions formed in said intermediate ring.

16. The expansion wall plug as claimed in claim 15 wherein said expansion socket includes at least one longitudinal slit extending through an end of said socket opposite said intermediate ring, said intermediate ring having anti-rotation indexing means extending into said slit.

17. A cone expansion wall plug comprising a rod, at on end thereof a cone adapted for being driven with a translational movement by the rod and causing expansion of an expansible socket disposed about the rod and, disposed about the rod, a spacer and an intermediate ring in abutment against the spacer and the expansible socket, for immobilizing the socket, during expansion thereof against translation with respect to the rod, wherein said intermediate ring is axially and radially rigid and said expansible socket comprises a portion of reduced outer diameter forming a radial bearing shoulder for said intermediate ring said expansion socket having at least one longitudinal slit extending through an end of said socket opposite said intermediate ring, said intermediate ring having anti-rotation indexing means extending into said slit, said intermediate ring being in radial abutment against a shearable collar of the spacer, said ring being in axial abutment against the spacer and the reduced portion of the expansible socket, said expansion cone being tapped and mounted on a threaded end of the rod, said rod, after expansion of the socket, being able to move in translation with respect to said socket and screwed into the cone, the other end of the rod also being threaded and carrying a nut, a screwing slit being formed in said other threaded end of the rod carrying the nut.

18. A cone expansion wall plug comprising a rod, at on end thereof a cone adapted for being driven with a translational movement by the rod and causing expansion of an expansible socket disposed about the rod and, disposed about the rod, a spacer and an intermediate ring in abutment against the spacer and the expansible socket, for immobilizing the socket, during expansion thereof against translation with respect to the rod, wherein said intermediate ring is axially and radially rigid and said expansible socket having an annular resilience groove of which provides a portion of reduced outer diameter and forms a radial bearing shoulder for said intermediate ring said expansion socket having at least one longitudinal slit extending through an end of said socket opposite said intermediate ring, said intermediate ring having anti-rotation indexing means extending into said slit, said intermediate ring being in radial abutment against a shearable collar of the spacer, said ring being in axial abutment against the spacer and the reduced portion of the expansible socket, said expansion cone being tapped and mounted on a threaded end of the rod, said rod, after expansion of the socket, being able to move in translation with respect to said socket and screwed into the cone, the other end of the rod also being threaded and carrying a nut, a screwing slit being formed in said other threaded end of the rod carrying the nut.

19. The expansion wall plug as claimed in claim 18, wherein said expansible socket comprises slits and said intermediate ring comprises anti-rotation indexing means introduced into said slits.

20. The expansion wall plug as claimed in claim 19, wherein said indexing means comprise axially projecting studs, introduced into the slit portions of the socket opening into the radial bearing shoulder of the socket.

21. The expansion wall plug as claimed in claim 19, wherein said indexing means comprises an axial tongue portion bend back towards the axis of the intermediate ring and introduced into a slit portion of the narrowed portion of the socket.

22. The expansion wall plug as claimed in claim 19, wherein said indexing means comprises an indentation introduced into slit portions of the narrowed portion of the socket.

23. The expansion wall plug as claimed in claim 19, wherein said intermediate ring comprises crenelated axially projecting portions in radial abutment against the shearable collar of the spacer.

24. A cone expansion wall plug comprising a rod, at one end thereof a cone adapted for being driven with a translational movement by the rod and causing expansion of an expansible socket disposed about the rod and, disposed about the rod, a spacer and an intermediate ring in abutment against the spacer and the expansible socket, for immobilizing the socket, during expansion thereof against translation with respect to the rod, wherein said intermediate ring is axially and radially rigid and said expansible socket comprises a portion of reduced outer diameter forming a radial bearing shoulder for said intermediate ring, said expansion socket having at least one longitudinal slit extending through an end of said socket opposite said intermediate ring, said intermediate ring having anti-rotation indexing means extending into said slit, said intermediate ring being in radial abutment against a shearable collar of the spacer, said ring being in axial abutment against the spacer and the reduced portion of the expansible socket.

* * * * *